United States Patent
Loken et al.

(10) Patent No.: US 10,213,718 B2
(45) Date of Patent: Feb. 26, 2019

(54) AIR INTAKE WATER SEPARATOR

(71) Applicant: Cummins Filtration IP, Inc., Columbus, IN (US)

(72) Inventors: Gregory K. Loken, Stoughton, WI (US); Robert A. Bannister, Stoughton, WI (US); Peter K. Herman, Stoughton, WI (US); Arun P. Janakiraman, Stoughton, WI (US); Dhawal B. Save, Virar (IN)

(73) Assignee: CUMMINS FILTRATION IP, INC., Columbus, IN (US)

( * ) Notice: Subject to any disclaimer, the term of this patent is extended or adjusted under 35 U.S.C. 154(b) by 94 days.

(21) Appl. No.: 15/314,371

(22) PCT Filed: Jun. 2, 2015

(86) PCT No.: PCT/US2015/033720
§ 371 (c)(1),
(2) Date: Nov. 28, 2016

(87) PCT Pub. No.: WO2015/187653
PCT Pub. Date: Dec. 10, 2015

(65) Prior Publication Data
US 2017/0100689 A1    Apr. 13, 2017

(30) Foreign Application Priority Data
Jun. 5, 2014    (IN) ............................ 2750/CHE/2014

(51) Int. Cl.
*B01D 45/08*    (2006.01)
*F02M 35/08*    (2006.01)
(Continued)

(52) U.S. Cl.
CPC ....... *B01D 45/08* (2013.01); *F02M 35/02483* (2013.01); *F02M 35/088* (2013.01);
(Continued)

(58) Field of Classification Search
CPC ...... B01D 46/02; B01D 46/002; B01D 46/08; B01D 46/0004; B01D 45/08; B01D 39/1623
(Continued)

(56) References Cited

U.S. PATENT DOCUMENTS 3,511,337 A * 5/1970 Pease ...................... F02C 7/045
  181/214
4,285,390 A * 8/1981 Fortune ................... F24F 3/044
  165/210
(Continued)

FOREIGN PATENT DOCUMENTS

WO    WO-2008/157699    12/2008
WO    WO-2011/094334    8/2011

OTHER PUBLICATIONS

International Search Report and Written Opinion based on PCT/US2015/033720, dated Nov. 19, 2015, 12 pages.

*Primary Examiner* — Duane Smith
*Assistant Examiner* — Minh Chau T Pham
(74) *Attorney, Agent, or Firm* — Foley & Lardner LLP

(57) ABSTRACT

Various embodiments relate to an air intake duct. The duct includes louvers forming an air inlet to a housing. Each louver includes an inlet section and an angled section, the angled section inclined with respect to the inlet section. The duct includes the housing positioned downstream of the louvers in an air flow direction. The housing includes a drain configured to permit separated water from an intake air passing through the louvers and into the housing to be drained from the housing. The duct includes an inner inlet duct that provides the intake air to a component. The inner inlet duct extends into the housing and positioned downstream of the louvers in the air flow direction. The inlet duct extends above the drain by a distance thereby forming a well (Continued)

in the housing between a top of the inner inlet duct and the drain.

18 Claims, 15 Drawing Sheets

(51) Int. Cl.
*F24F 13/22* (2006.01)
*F24F 13/02* (2006.01)
*F02M 35/024* (2006.01)

(52) U.S. Cl.
CPC ............ *F24F 13/02* (2013.01); *F24F 13/222* (2013.01); *F24F 2013/221* (2013.01)

(58) Field of Classification Search
USPC ...... 55/326, 334, 341.1, 418, 444, 497, 525; 181/214
See application file for complete search history.

(56) References Cited

U.S. PATENT DOCUMENTS

| | | | |
|---|---|---|---|
| 4,373,940 A | | 2/1983 | Petersen |
| 4,883,509 A | * | 11/1989 | Giusti .................. B01D 46/002 55/326 |
| 4,883,510 A | * | 11/1989 | Giusti .................. B01D 46/002 55/326 |
| 4,902,317 A | * | 2/1990 | Gutermuth ............. B01D 45/08 55/326 |
| 5,030,261 A | * | 7/1991 | Giusti .................. B01D 46/002 55/326 |
| 5,104,431 A | | 4/1992 | Fewel, Jr. |
| 6,273,938 B1 | * | 8/2001 | Fanselow ........... B01D 39/1623 55/497 |
| 7,069,893 B2 | | 7/2006 | Cusumano et al. |
| 8,236,080 B2 | * | 8/2012 | Desjardins ......... B01D 46/0004 24/505 |

\* cited by examiner

AIR INTAKE WATER SEPARATOR

CROSS REFERENCE TO RELATED APPLICATIONS

This application is a National Stage of PCT Application No. PCT/US2015/033720, filed Jun. 2, 2015, which claims priority to Indian Provisional Patent Application No. 2750/CHE/2014, entitled "AIR INTAKE WATER SEPARATOR," by Loken et al., filed on Jun. 5, 2014. The contents of both applications are herein incorporated by reference in their entirety and for all purposes.

TECHNICAL FIELD

The present invention relates generally to air filtration systems having an air intake duct that removes water from intake air to prevent water from reaching the air cleaner.

BACKGROUND

Internal combustion engines generally combust a mixture of fuel (e.g., gasoline, diesel, natural gas, etc.) and air. Prior to entering the engine, the intake air is typically passed through an air filter to remove particulate (e.g., dust) from the intake air prior to combustion. The presence of moisture in the intake air can cause damage to the engine, reduce the efficiency of the air filter media, and reduce the life of the air filter media. Current moisture removal systems positioned upstream of the air filters add a significant amount of restriction (e.g., cause a high pressure drop) to the air filter system, thereby reducing performance of the air filter system.

SUMMARY

An exemplary embodiment relates to an air intake duct. The air intake duct includes a plurality of louvers forming an air inlet to a housing. Each louver includes an inlet section and an angled section, the angled section inclined with respect to the inlet section. The air intake duct includes the housing positioned downstream of the plurality of louvers in an air flow direction. The housing includes a drain configured to permit separated water from an intake air passing through the plurality of louvers and into the housing to be drained from the housing. The air intake duct includes an inner inlet duct that provides the intake air to a component. The inner inlet duct extends into the housing and positioned downstream of the plurality of louvers in the air flow direction. The inlet duct extends above the drain by a distance thereby forming a well in the housing between a top of the inner inlet duct and the drain.

Another exemplary embodiment relates to an air intake duct. The air intake duct includes a separator having a cylindrical shape. The separator includes a plurality of louvers arranged in a cylindrical manner to form they cylindrical shape of the separator. Each of the plurality of louvers includes a plurality of planar sections arranged in an angled manner to separate water contained in intake air passing through the plurality of louvers. The air intake duct further includes a cover fit on a top of the separator. The air intake duct includes a central tube, the separator attached to the central tube. The central tube is positioned downstream of the plurality of louvers in an airflow direction.

These and other features, together with the organization and manner of operation thereof, will become apparent from the following detailed description when taken in conjunction with the accompanying drawings.

DETAILED DESCRIPTION

Referring to the figures generally, an air intake duct of an air filter system that removes water from intake air upstream of an air filter assembly is described. The air intake duct includes a plurality of vertical louvers positioned upstream of a housing having an inner inlet that provides intake air to the air filter assembly. The louvers coalesce and separate the water in the intake air prior to entering the housing. Additionally, the housing causes an abrupt change of direction of the intake air that causes coalescence of remaining water in the intake air against the housing. The housing and the inner inlet create a well that collects remaining water such that it can be ejected to the ambient by a drain hole while keeping the pressure drop at a minimum. Accordingly, the air intake duct helps prevent water from reaching the air filter assembly, and thus from reaching the device receiving filtered air from the air filter assembly. Further, the air intake duct removes the water from intake air without adding a significant amount of restriction to the air filter system.

Figure 1:
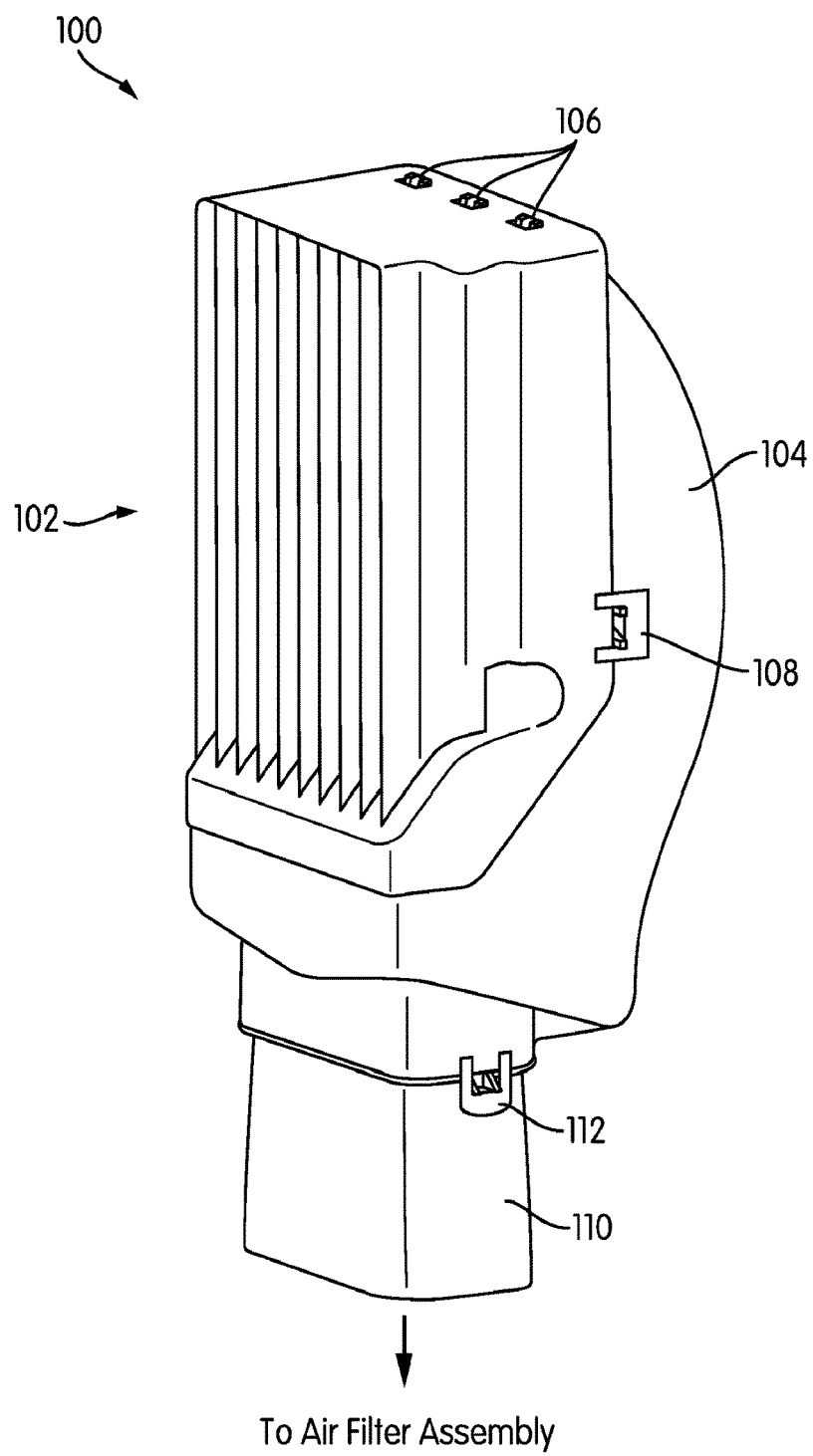
FIG. 1 is a perspective view of an air intake duct according to an exemplary embodiment.
Figure 2:
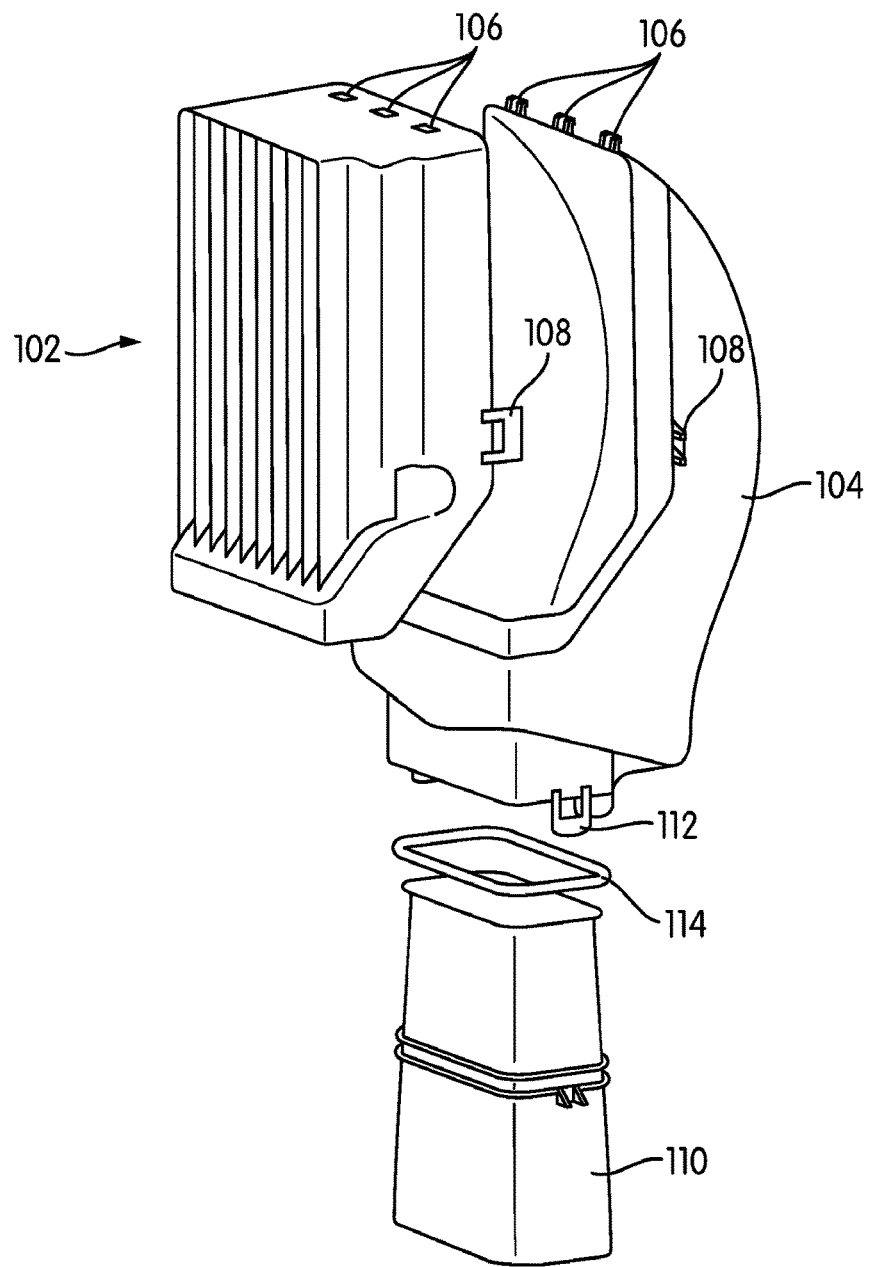
FIG. 2 is an exploded view of the air intake duct of FIG. 1.

Referring to FIGS. 1 and 2, views of an air intake duct 100 are shown according to an exemplary embodiment. FIG. 1 shows a perspective view of the air intake duct 100. FIG. 2 shows an exploded view of the air intake duct 100. The air intake duct 100 supplies intake air to a component such as an air filter assembly (not shown). Exemplary air filter assemblies are described in U.S. Pat. No. 8,668,756, U.S. Pat. No. 8,632,618, U.S. Pat. No. 8,535,403, U.S. Pat. No. 8,147,578, U.S. Pat. No. 7,867,311, U.S. Pat. No. 6,958,083, and U.S. Pat. No. 6,814,772, each of which are incorporated by reference in their entireties for all purposes.

The air intake duct 100 receives intake air through a plurality of louvers 102. The louvers 102 are arranged in a vertical manner to direct water out of the air intake duct 100 and to prevent re-entrainment of the separated water. A bottom portion of the louvers may include a ramp that guides separated water out of the louvers 102 and away from the air intake duct 100. The louvers 102 are hingedly attached to a housing 104 through a hinge assembly 106. A snap connection 108 secures the louvers 102 to the housing 104. Alternatively, a buckle, a fastener, or another connector secures the louvers 102 to the housing 104. The housing 104 is positioned downstream of the louvers 102 in an air flow direction. The housing 104 is fit over an inner inlet 110. The inner inlet 110 extends into the housing 106 and is positioned downstream of the louvers 102 in the air flow direction. The inner inlet 110 is an inlet duct that provides the intake air to the air filter assembly. The housing 104 is secured to the inner inlet 110 through a snap connection 112. A seal 114 or gasket (formed of rubber in one implementation) may be provided between the housing 104 and the inner inlet 110 to prevent air from leaking directly into the inner inlet 110 (e.g., intake air that bypasses the louvers 102) or to prevent air from leaking out of the housing 104 (e.g., intake air that has already passed through the louvers 102).

Figure 3:
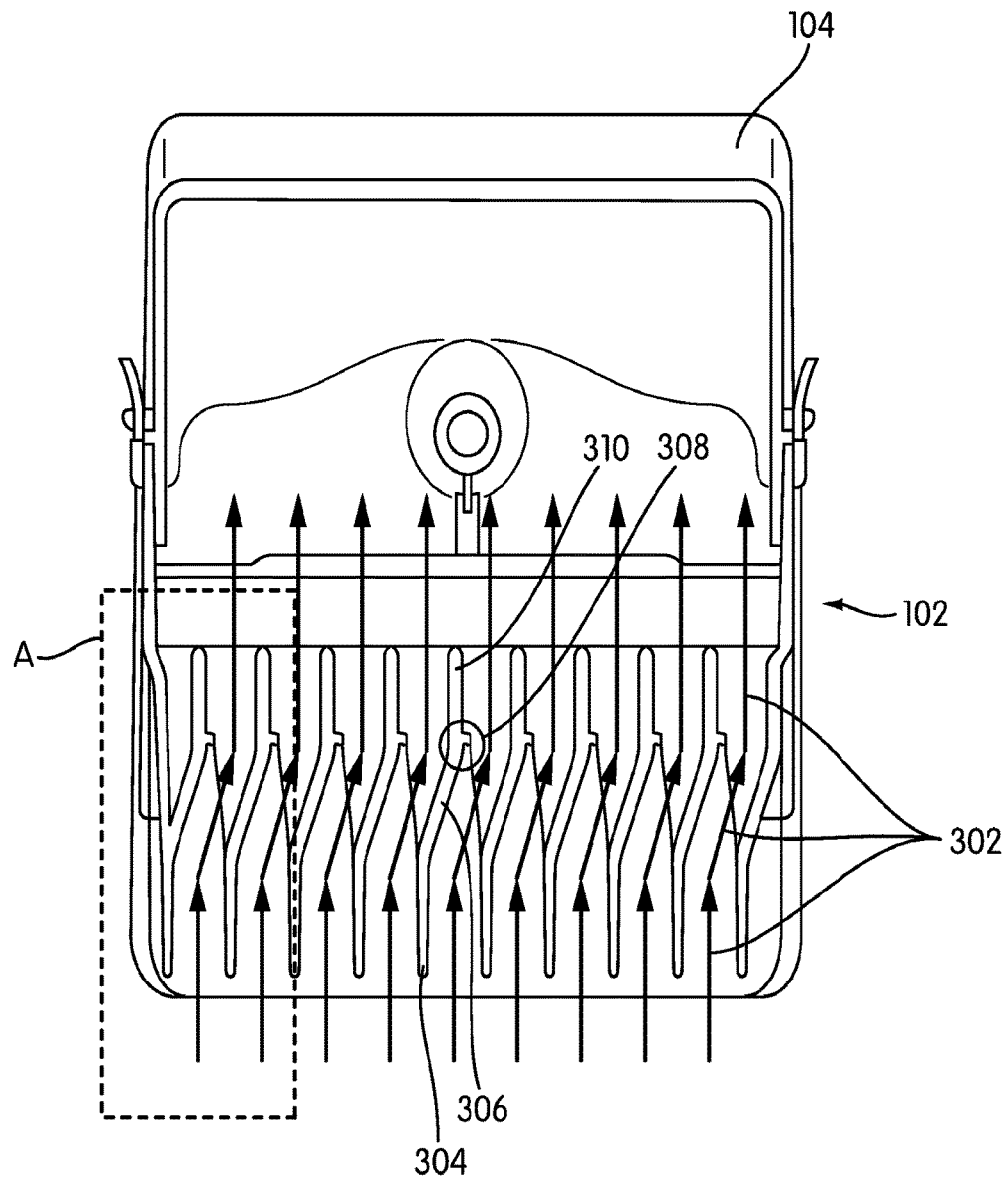
FIG. 3 is a top cross-sectional view of the air intake duct of FIG. 1.

Referring to FIG. 3, a top cross-sectional view of the air intake duct 100 is shown. As discussed above, the air intake duct 100 includes the plurality of louvers 102. Each louver 102 routes intake air along a flow path 302 into the housing 104, where the intake air is then routed into the inner inlet 110 and into the air filter assembly. Each louver 102 includes an inlet section 304, an angled second section 306, a hook portion 308, and an outlet section 310. The inlet section 304 is positioned upstream of the angled section 306 in the air flow direction (i.e., in the direction of the flow path 302). The angled section 306 is positioned upstream of the hook portion 308 in the air flow direction. The hook portion 308 is positioned upstream of the outlet section 310 in the air flow direction. The inlet section 304 receives the intake air. The angled section 306 routes the intake air to the hook portion 308. The angled section 306 is angled with respect to the inlet section 304. At least a portion of the water contained within the intake air coalesces on the inlet section 304 and the angled section 306. The hook portion 308 captures the coalesced water and diverts the captured water down and away from the housing 104. Accordingly, the hook portion 308 prevents at least a portion of the water contained in the intake air from entering the housing 104. Depending on the orientation of the air intake duct 100, gravity may pull the water down and out of the hook portion 308 such that it falls outside of the housing 104. The outlet section 310 routes the intake air to the housing 104. The inlet section 304, the angled section 306, and the outlet section 310 are substantially planar. The details of the water removal from the intake are described in further detail below.

Figure 4:
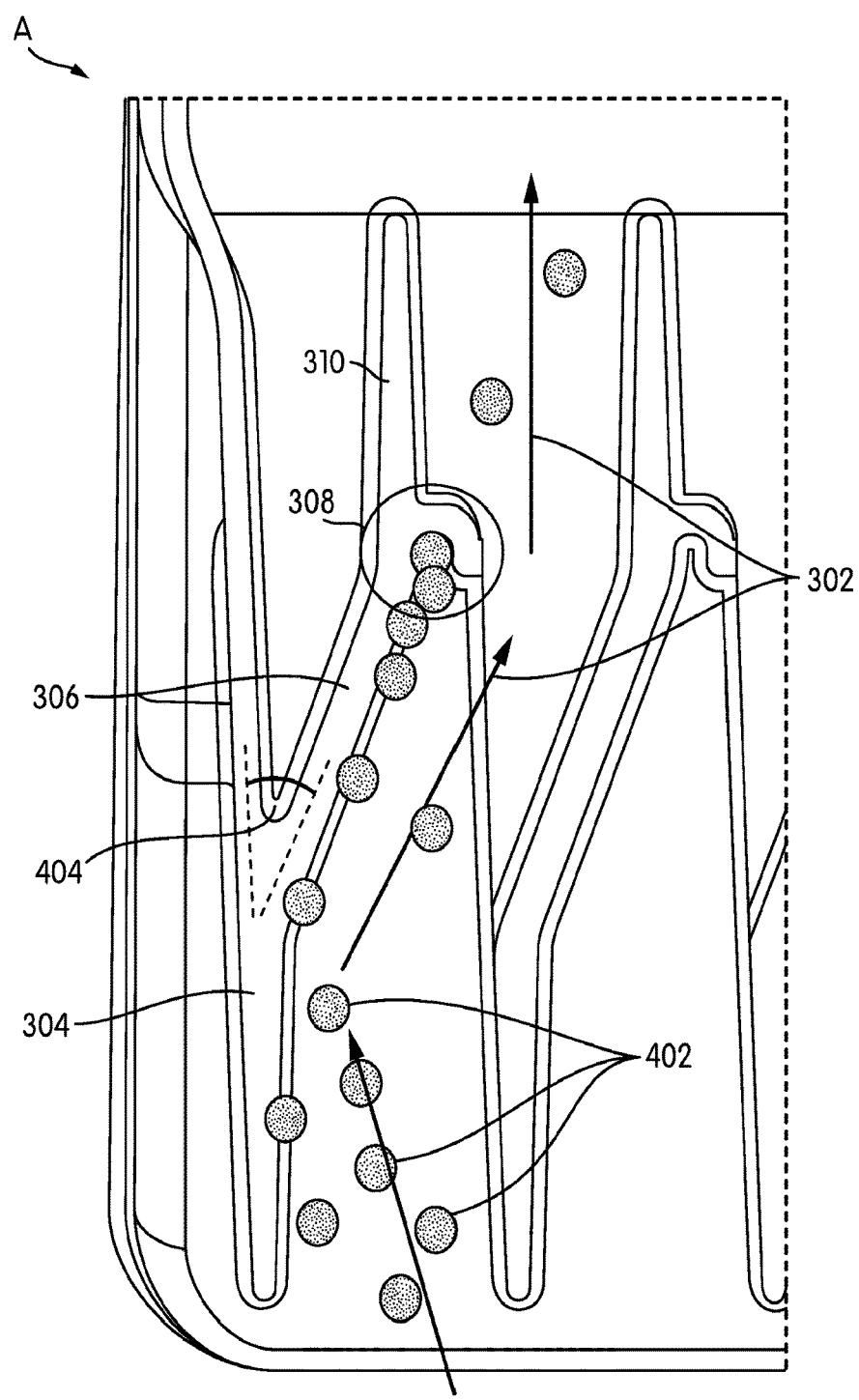
FIG. 4 is a close-up top cross-section view of a portion of the air intake duct of FIG. 1.

Referring to FIG. 4, a close-up top cross-section view of portion A of the air intake duct 100 is shown. The intake air travels along the flow path 302 through the louvers 102. The intake air includes water droplets 402. As the intake air travels through the individual louvers 102, at least a portion of the water droplets coalesce on the inlet section 304 and the angled section 306. The angled section 306 is inclined by an angle 404 with respect to the inlet section 304. The angle 404 is less than 90 degrees. In some arrangements, the angle is less than 45 degrees. The angle of inclination causes an abrupt change in air flow direction in the flow path 302. Because the water droplets 402 are heavier than the intake air, the water droplets coalesce and impact against the inlet section 304 and the angled section 306 due to the inertia of the water droplets. The inertia of the water droplets 402 and the velocity of the intake air propel the water droplets 402 into the hook portion 308. The hook portion 308 captures the coalesced water droplets 402 and prevents the captured water droplets 402 from traveling past the outlet section 310 and into the housing 104. The louvers 102 are vertical such that the captured water droplets 402 are carried down and away from the air intake duct 100 such that the captured water droplets do not enter the housing 104. However, some water droplets 402 may pass through the outlet section 308 and into the housing 104.

Figure 5:
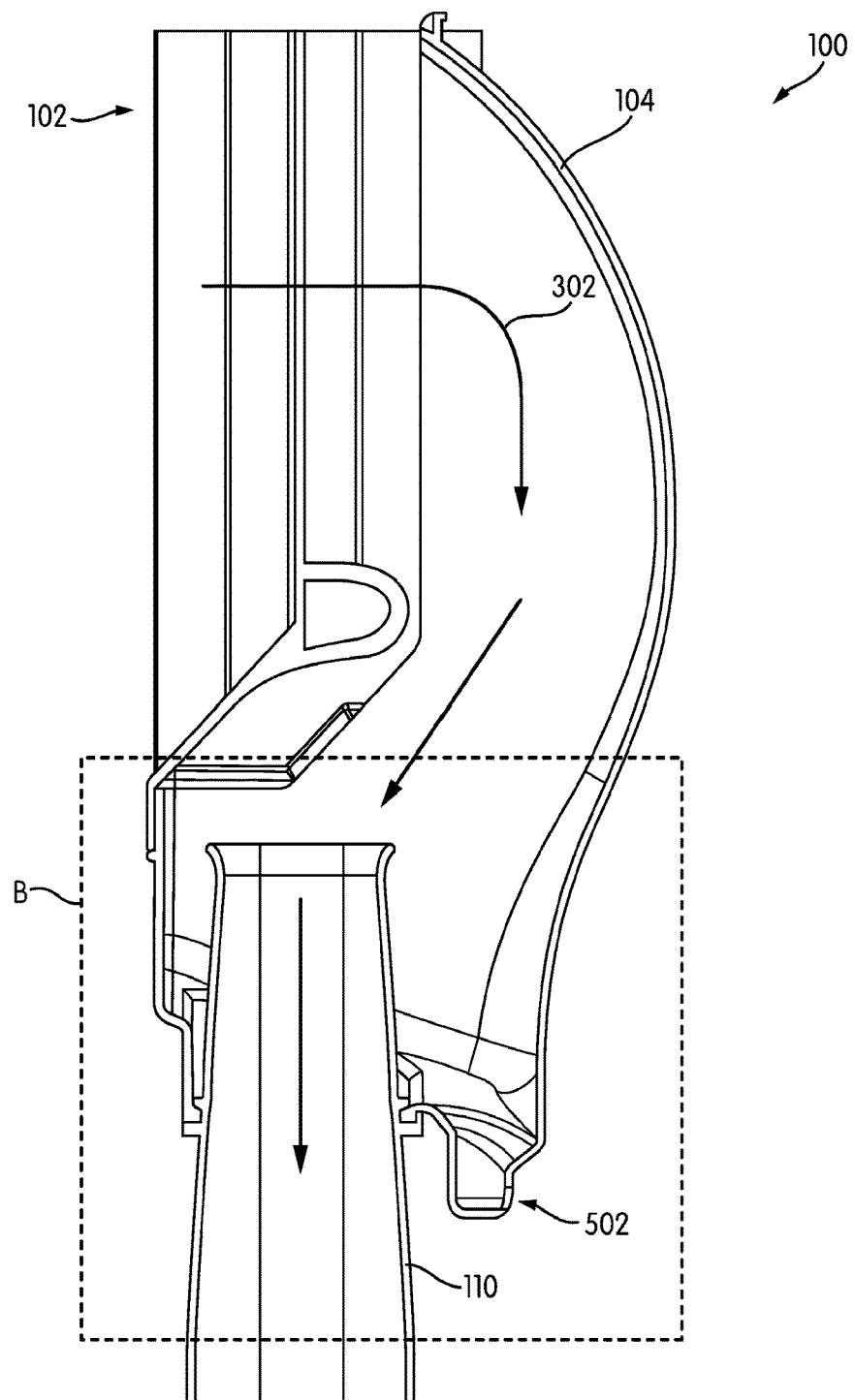
FIG. 5 is a side cross-sectional view of the air intake duct of FIG. 1.

FIG. 5 is a side cross-sectional view of the air intake duct 100. After passing through the louvers 102, the intake air continues along the air flow path 302. The flow path 302 takes a sharp turn in the direction of the inner inlet 110. Similar to as described above with respect to the angled section 306 of the louvers 102, the abrupt change in air flow direction causes water droplets 402 that pass through the louvers to impact and coalesce against the housing 104 due to the heavier weight and higher inertia of the water droplets 402. The coalesced water droplets then fall towards a drain 502 in the housing 104. The drain 502 is oriented to cause an air flow eddy that further causes droplet impaction of the intake air against the wall of the housing 104. The details of the air flow path 302 through the housing 104 are described in greater detail below.

Figure 6:
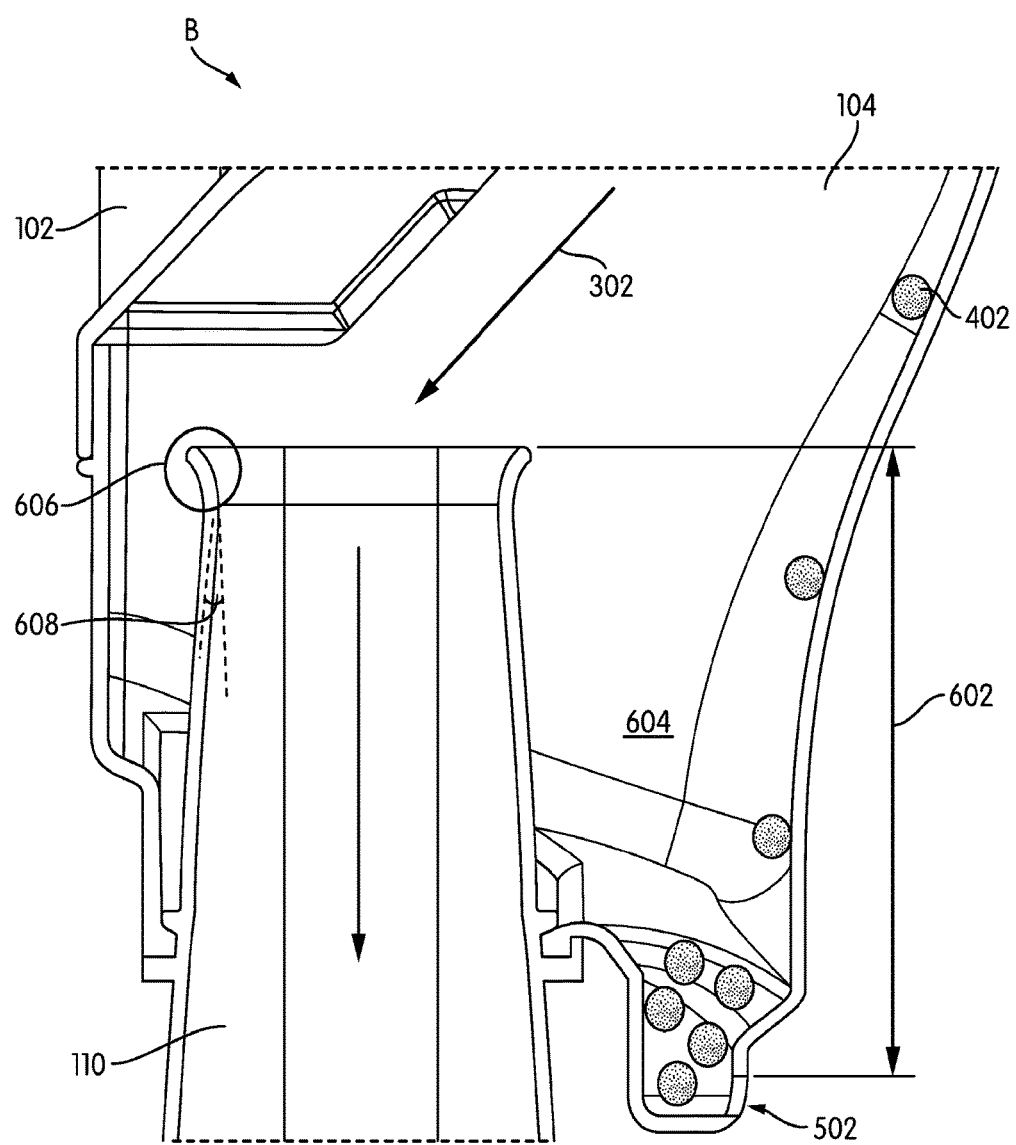
FIG. 6 is a close-up side cross-section view of a portion of the air intake duct of FIG. 1.

FIG. 6 is a close-up side cross-section view of portion B of the air intake duct 100. As described above, after the sharp turn of the air flow path 302 into the housing 104 from the louvers 102, the water droplets 402 coalesce onto the wall of the housing 104. The water droplets 402 gather at the drain 502. The drain 502 allows for removal of pooled water from the housing to the ambient. The drain 502 may be connected to a hose.

Still referring to FIG. 6, the inner inlet 110 extends above the drain 502 by a distance 602. The distance 602 from the drain 502 to the top of the inner inlet 110 may be between 1.5 to 5 times the number of inches of $H_2O$ of pressure drop caused by the air intake duct 100. The distance 602 that the inner inlet 110 extends above the drain 502 forms a well 604 where coalesced water can pool without entering into the inner inlet 110. The top of the inner inlet 110 includes a rounded edge 606, and the walls of the inner inlet 110 are angled away from vertical by approximately 8 degrees, which both help to reduce the pressure drop caused by the air intake duct 100.

Figure 7:
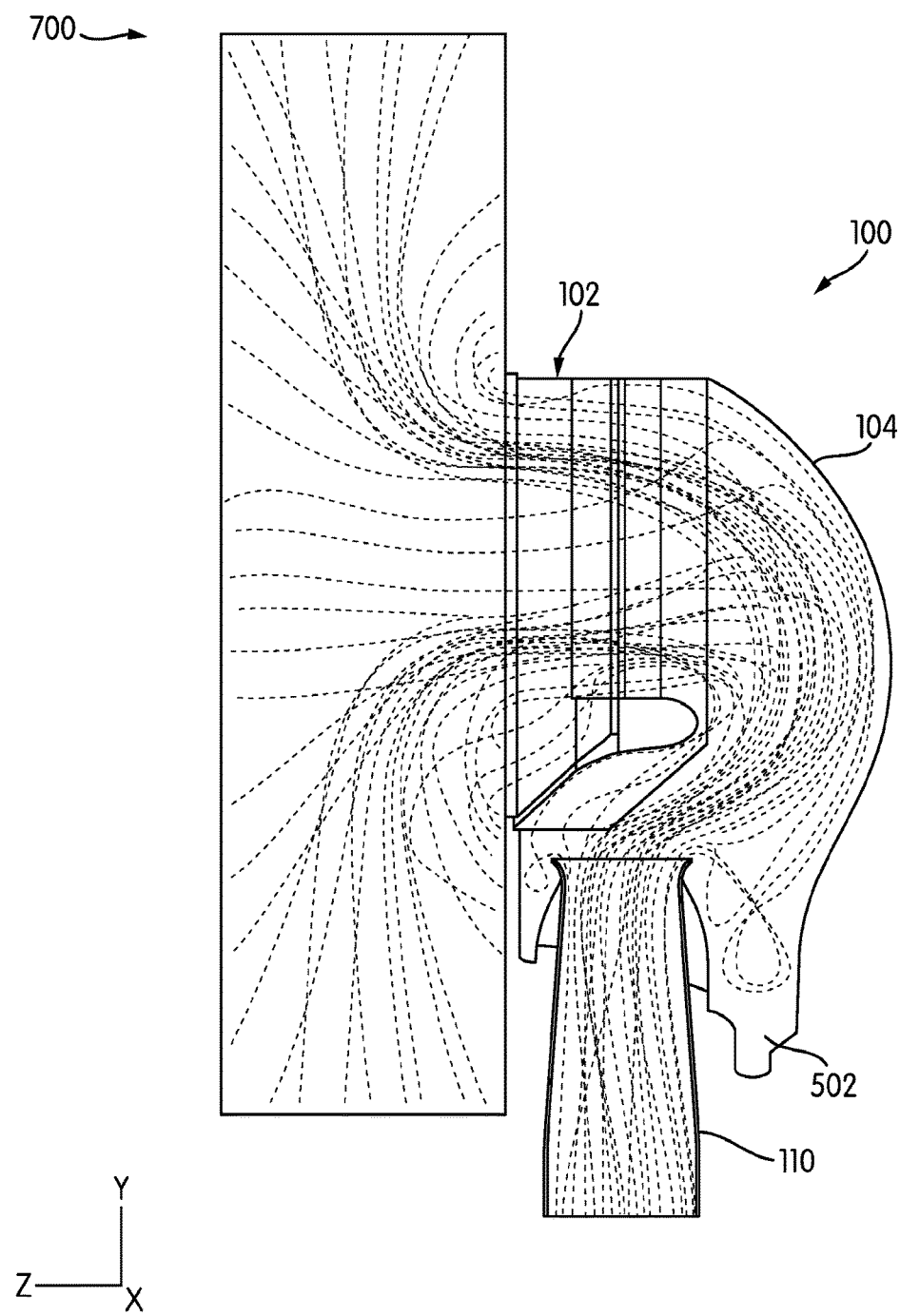
FIGS. 7 through 9 show computer-generated computational fluid dynamic analysis charts of the air intake duct of FIG. 1.

FIG. 7 is a computer-generated computational fluid dynamics ("CFD") analysis 700 showing air flow through the air intake duct 100. The flow lines of the analysis represent the path taken by intake air as the intake air flows through the air intake duct 100. As discussed above with respect to drain 502 and as shown more clearly by the air flow lines, the drain 502 is oriented to cause an air flow eddy that further causes droplet impaction of the intake air against the wall of the housing 104. The flow lines of the analysis 700 also indicate that the flow velocity near the drain 502 is low, which reduces the chance of water particles being re-entrained into the air flow and carried into the inner inlet 110.

Figure 8:
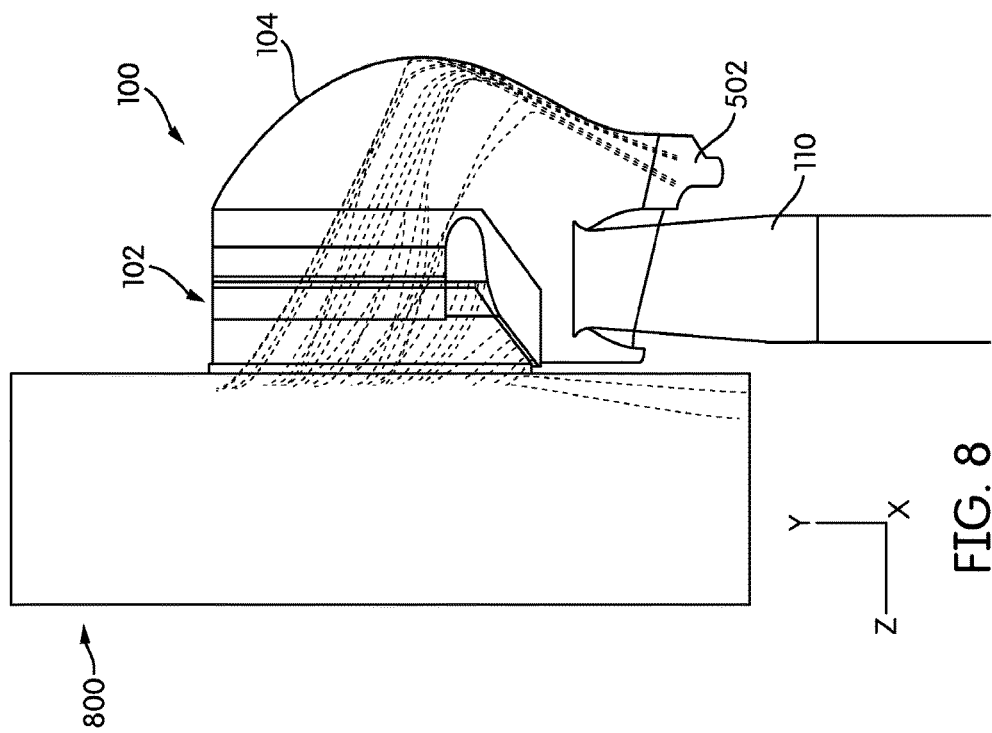

Referring to FIG. 8, a CFD analysis 800 showing particle flow (e.g., water droplet flow) through the air intake duct 100 is shown. In the analysis 800, simulated particles are injected upstream of the louvers 102. A large portion of the injected particles are removed as the particles flow through the louvers 102. The particles that pass through the louvers coalesce on the wall of the housing 104 and pool near the drain 502. The analysis 800 indicates that the louver 102 arrangement and housing 102 geometry are efficient in water separation.

Figure 9:
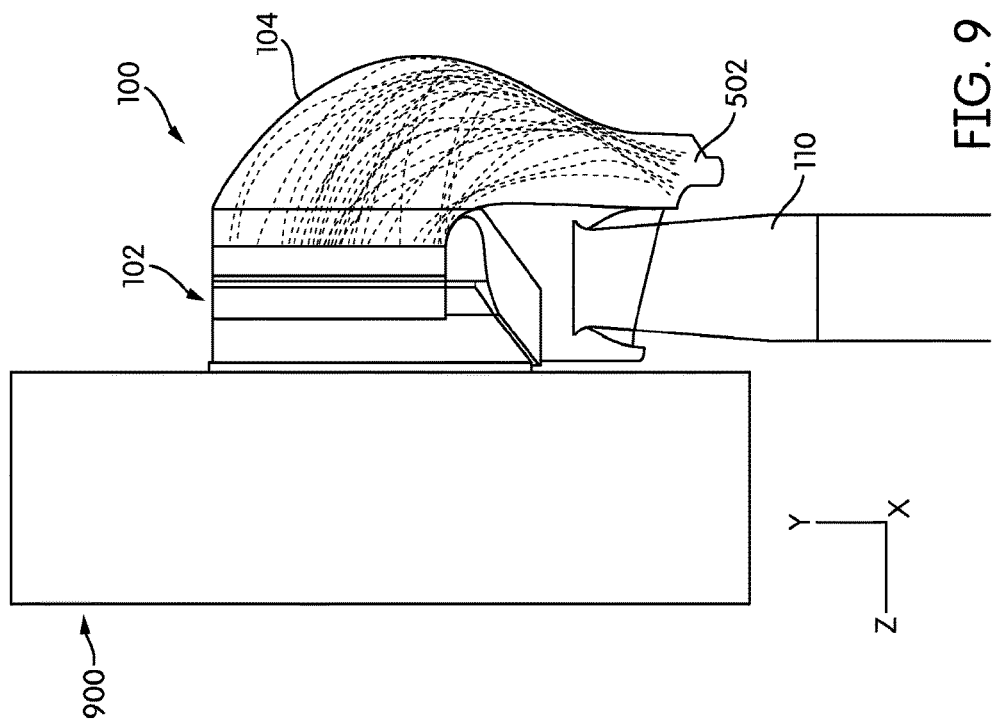

FIG. 9 is a CFD analysis 900 showing particle flow (e.g., water droplet flow) through the air intake duct 100. In the analysis 900, simulated particles are injected downstream of the louvers 102. Similar to analysis 800 above, particles that enter the housing 104 are separated through inertial impaction and through coalescing as the inertia of the particles carry the particles into the wall of the housing 104. The separated particles pool near the drain 502.

Figure 10:
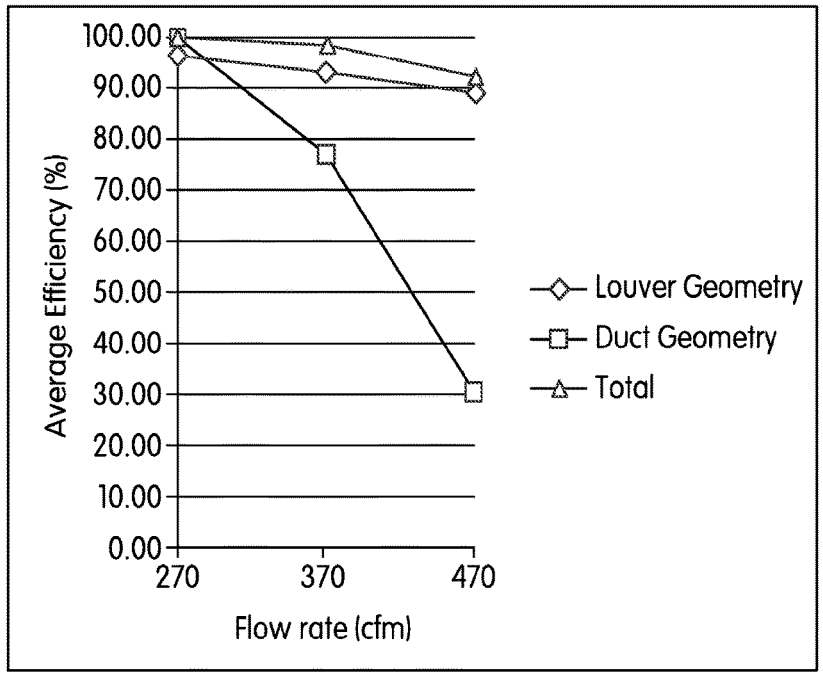
FIGS. 10 and 11 show line graphs of testing data relating to the air intake duct of FIG. 1.

Referring to FIG. 10, a line graph comparing average efficiency percentage versus flow rate (in cubic feet per minute) for the air intake duct 100 is shown.

Figure 11:
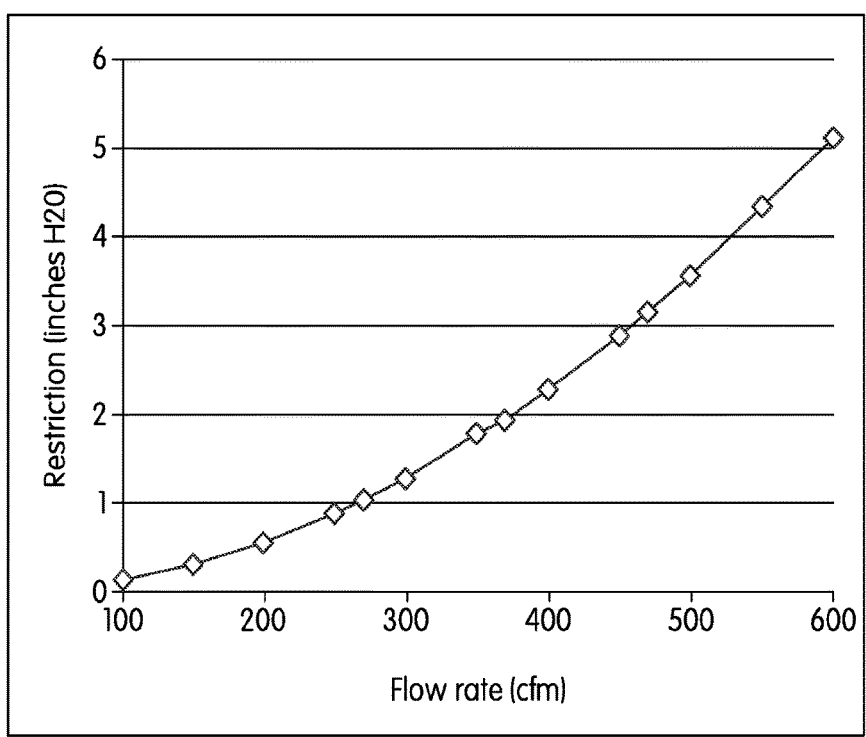

Referring to FIG. 11, a line graph showing system restriction (in inches of $H_2O$) versus flow rate (in cubic feet per minute) for the air intake duct 100 is shown.

Figure 12:
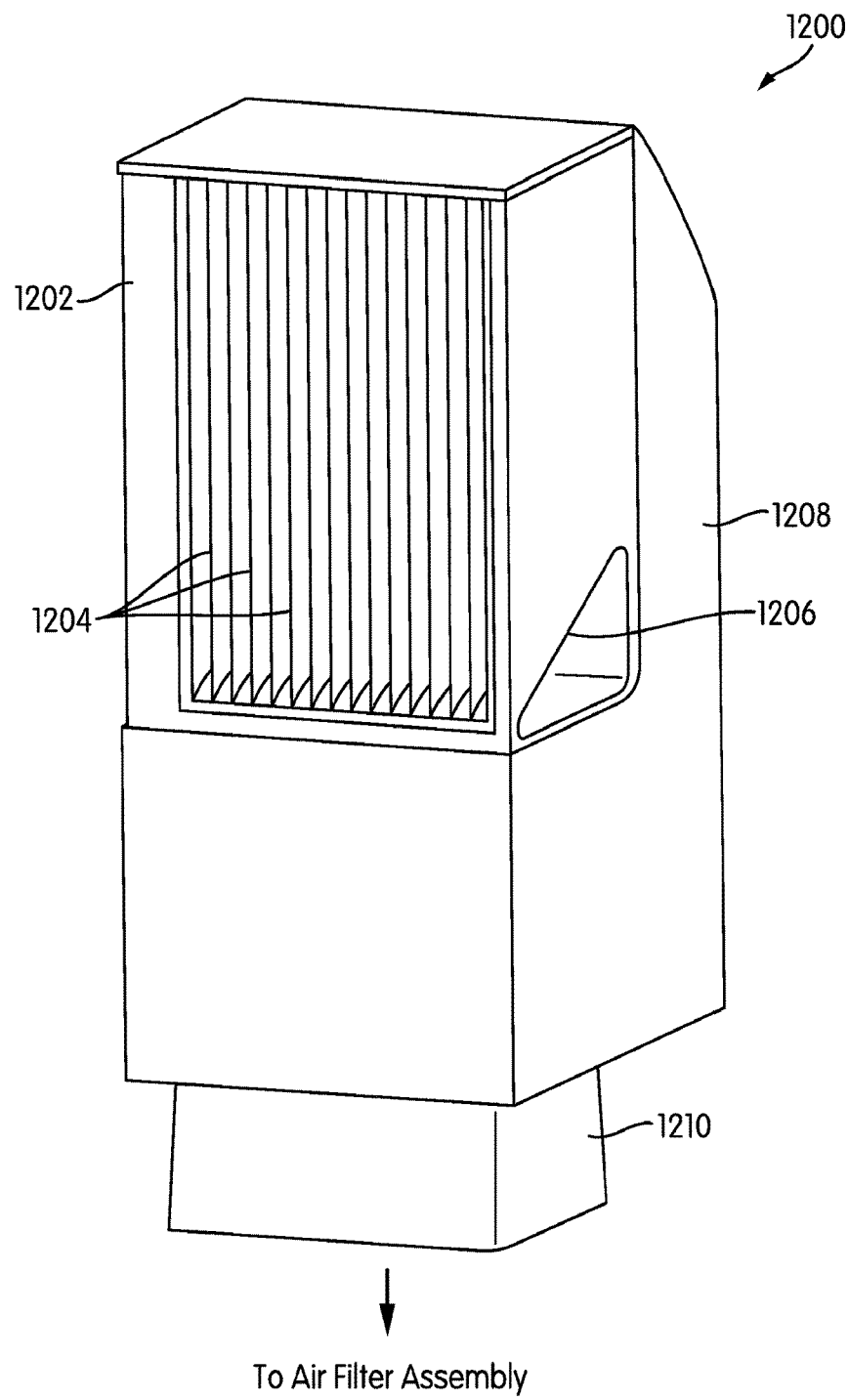
FIG. 12 is a perspective view of an air intake duct according to another exemplary embodiment.

FIG. 12 is a perspective view of an air intake duct 1200 is shown according to another exemplary embodiment. The air intake duct 1200 is similar to the air intake duct 100. The air intake duct 1200 receives intake air through a plate separator 1202. The plate separator 1202 includes a plurality of louvers 1204. Each of the plurality of louvers 1204 includes a plurality of planar sections arranged in an angled manner (as described in further detail below with respect to FIG. 14) that separate water contained in the intake air passing through the louvers. The separator plate 1204 includes a ramp 1206 that guides separated water out of the separator plate 1202 and away from a housing 1208. The separator plate 1202 is attached to the housing 1208. The separator plate 1202 may be attached to the housing 1208 through a hinge connection (e.g., in a similar manner as described above with the air intake duct 100), a mechanical fastener (e.g., a snap connector, a rivet, a screw, etc.), a chemical fastener (e.g., epoxy), or a combination thereof. The housing 1208 is positioned downstream of the louvers 1204 in an air flow direction. The housing 1208 is fit over an inner inlet 1210. The inner inlet 1210 extends into the housing 1208 and is positioned downstream of the louvers 1204 in the air flow direction. The inner inlet 1210 is an inlet duct that provides the intake air to the air filter assembly (e.g., one of the air filter assemblies described above with respect to the air intake duct 100). The housing 1208 may be secured to the inner inlet 1210 through a snap connection in a similar manner as described above with respect to housing 104 and inner inlet 110. A seal or gasket (formed of rubber in one implementation) may be provided between the housing 1208 and the inner inlet 1210 to prevent air from leaking directly into the inner inlet 1210 (e.g., intake air that bypasses the louvers 1204) or to prevent air from leaking out of the housing 1208 (e.g., intake air that has already passed through the louvers 1204).

Figure 13:
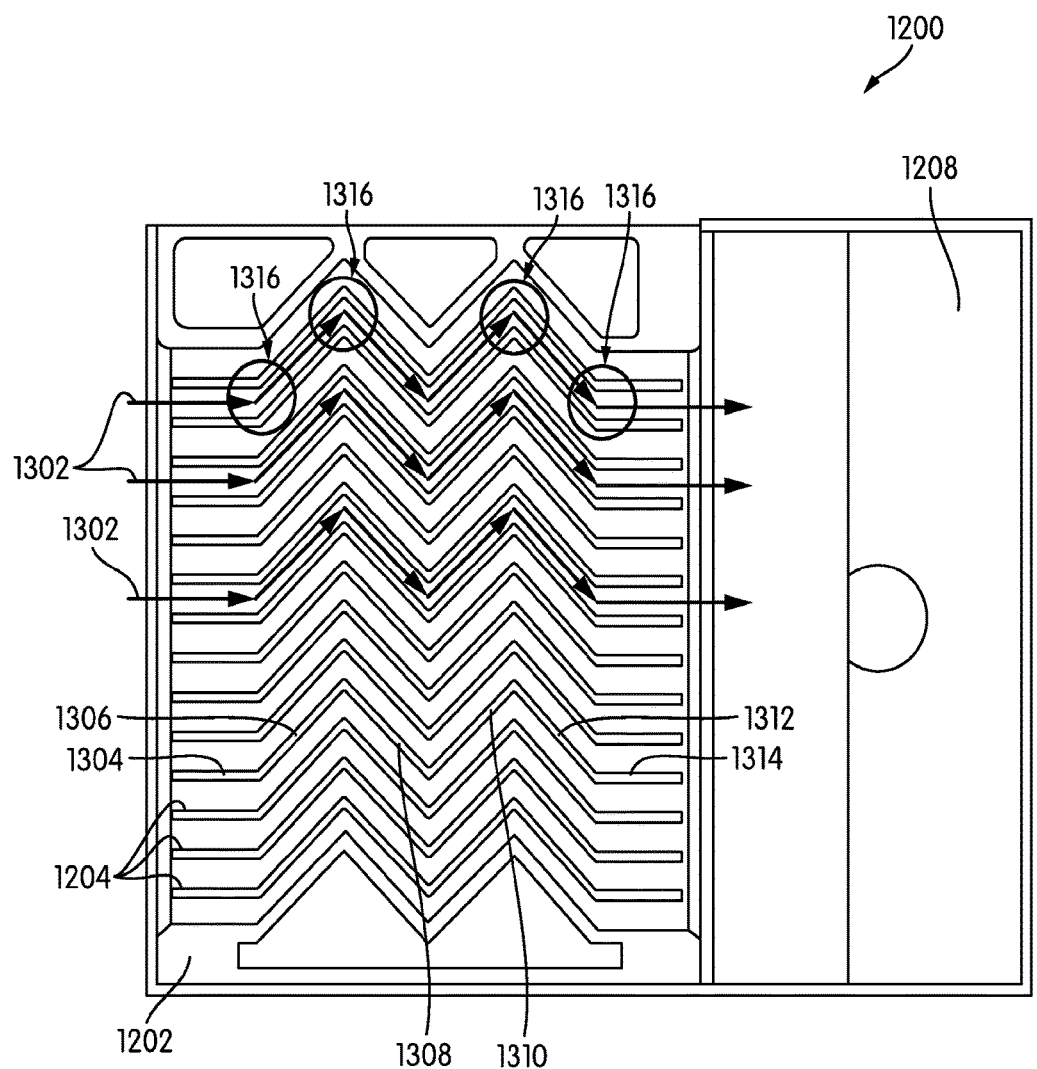
FIG. 13 is a top cross-sectional view of the air intake duct of FIG. 12.

Referring to FIG. 13, a top cross-sectional view of the air intake duct 1200 is shown. As discussed above, the air intake duct 1200 includes the plurality of louvers 1204. Each louver 1204 routes intake air along a flow path 1302 into the housing 1208, where the intake air is then routed into the inner inlet 1210 and into the air filter assembly. Each louver 1204 includes a plurality of planar sections, each section arranged at an angle with adjacent sections. As shown in FIG. 13, each louver 1204 includes an inlet section 1304, a first angled section 1306, a second angled section 1308, a third angled section 1310, a fourth angled section 1312, and an outlet section 1314. The inlet section 1304 is positioned upstream of the angled sections 1306-1312 in the air flow direction (i.e., in the direction of the flow path 1302). The angled sections 1306-1312 are positioned upstream of the outlet section 1314 in the air flow direction. The angle between the inlet section 1304 and the first angled section 1306 is greater than 90 degrees. The angle between adjacent angled sections 1306-1312 is approximately 90 degrees. The angle between the fourth angled section 1312 and the outlet section 1314 is greater than 90 degrees. The first and second angled sections 1306 and 1308 form a first V shape portion. The third and fourth angled sections 1310 and 1312 form a second V shape portion. Although shown as including two V shape portions, alternative arrangements include a single V shape portion or three or more V shape portions. The each V shape portion in the separator plate 1202 adds a certain amount of pressure drop to the air intake duct 1200.

Figure 14:
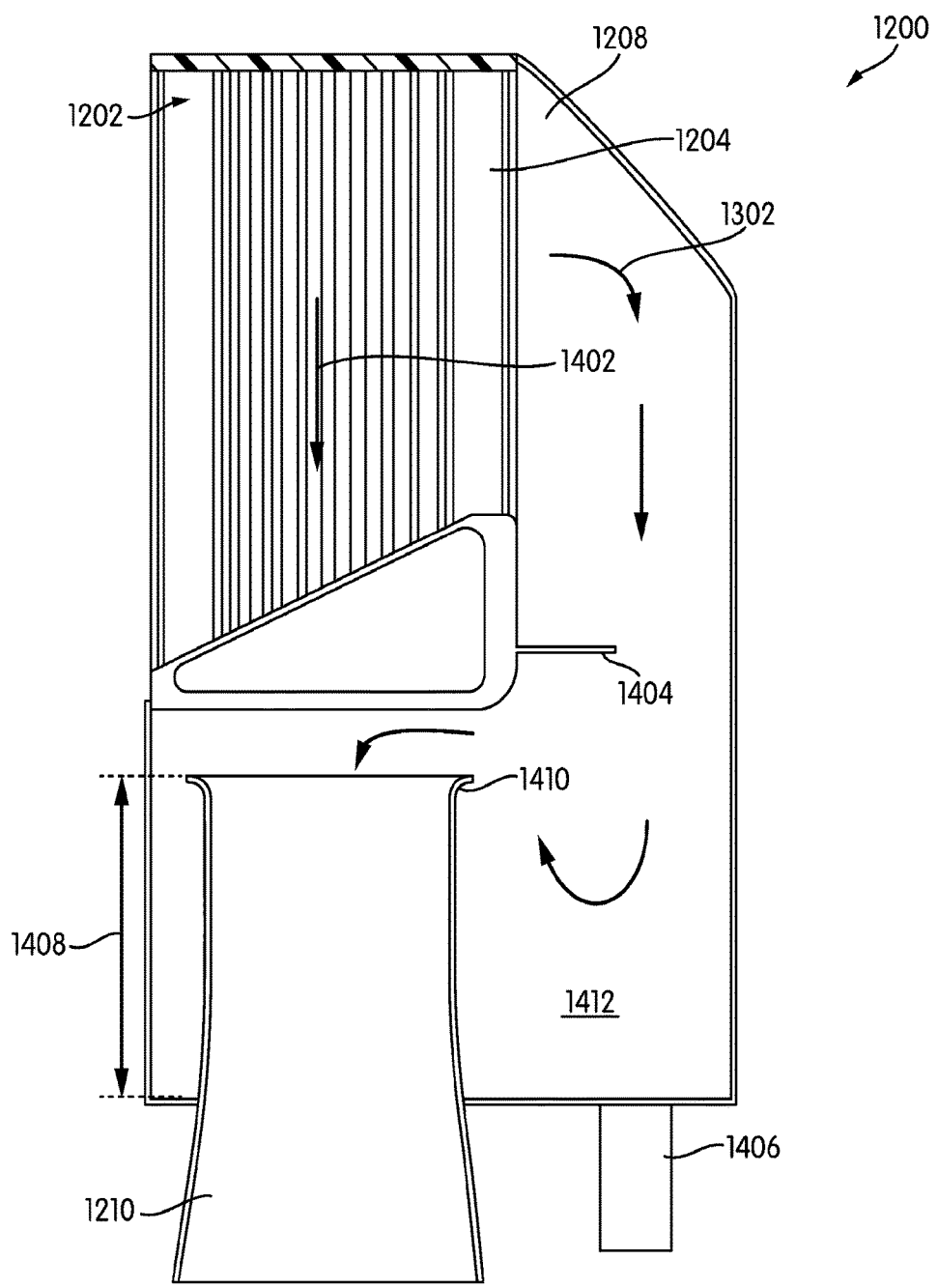
FIG. 14 is a side cross-sectional view of the air intake duct of FIG. 12.

The angles between the adjacent sections 1304-1314 cause abrupt changes in air flow direction in the flow path 1302. The abrupt changes in air flow direction create impaction sites 1316 that coalesce the water in the intake air. Because the water droplets in the intake air are heavier than the intake air, the water droplets coalesce and impact against the planar surfaces of the louvers 1204 at the impaction sites 1316 due to the greater inertia of the water droplets. As shown in FIGS. 12 and 14, the louvers 1204 are vertical such that the captured water droplets are carried down such that the captured water droplets do not enter the housing 1208.

Referring to FIG. 14, a side cross-sectional view of the air intake duct 1200 is shown. As discussed above, the louvers 1204 are arranged in a vertical manner with respect to gravity. Accordingly, water that coalesces on the surface of the louvers 1204 falls in the direction of gravity as indicated by arrow 1402. The water falls until the water reaches the ramp 1206, where the water is carried out of the air intake duct 1200 by the ramp 1206. The separator plate 1202 includes a baffle 1404 that further prevents water from dripping from the separator plate 1202 into the inner inlet 1210.

After passing through the separator plate 1202, the intake air continues along the air flow path 1302. The flow path 1302 takes a sharp turn in the direction of the inner inlet 1210 in a similar manner as done with respect to the air intake duct 100. The abrupt change in air flow direction causes water droplets that pass through the louvers 1204 to impact and coalesce against the housing 1208 due to the heavier weight and higher inertia of the water droplets. The coalesced water droplets then fall towards a drain 1406 in the housing 1208. The drain 1406 is oriented to cause an air flow eddy in the air flow path 1302 that further causes droplet impaction of the intake air against the wall of the housing 1208. The inner inlet 1210 extends above the drain 1406 by a distance 1408. The distance 1408 from the drain 1406 to the top 1410 of the inner inlet 1210 may be between 1.5 to 5 times the number of inches of $H_2O$ of pressure drop caused by the air intake duct 1200. The distance 1408 that the inner inlet 1210 extends above the drain 1406 forms a well 1412 where coalesced water can pool without entering into the inner inlet 1210. The top 1410 of the inner inlet 1210 includes a rounded edge, and the walls of the inner inlet 1210 are angled away from vertical by approximately 8 degrees, which both help to reduce the pressure drop caused by the air intake duct 100.

Figure 15:
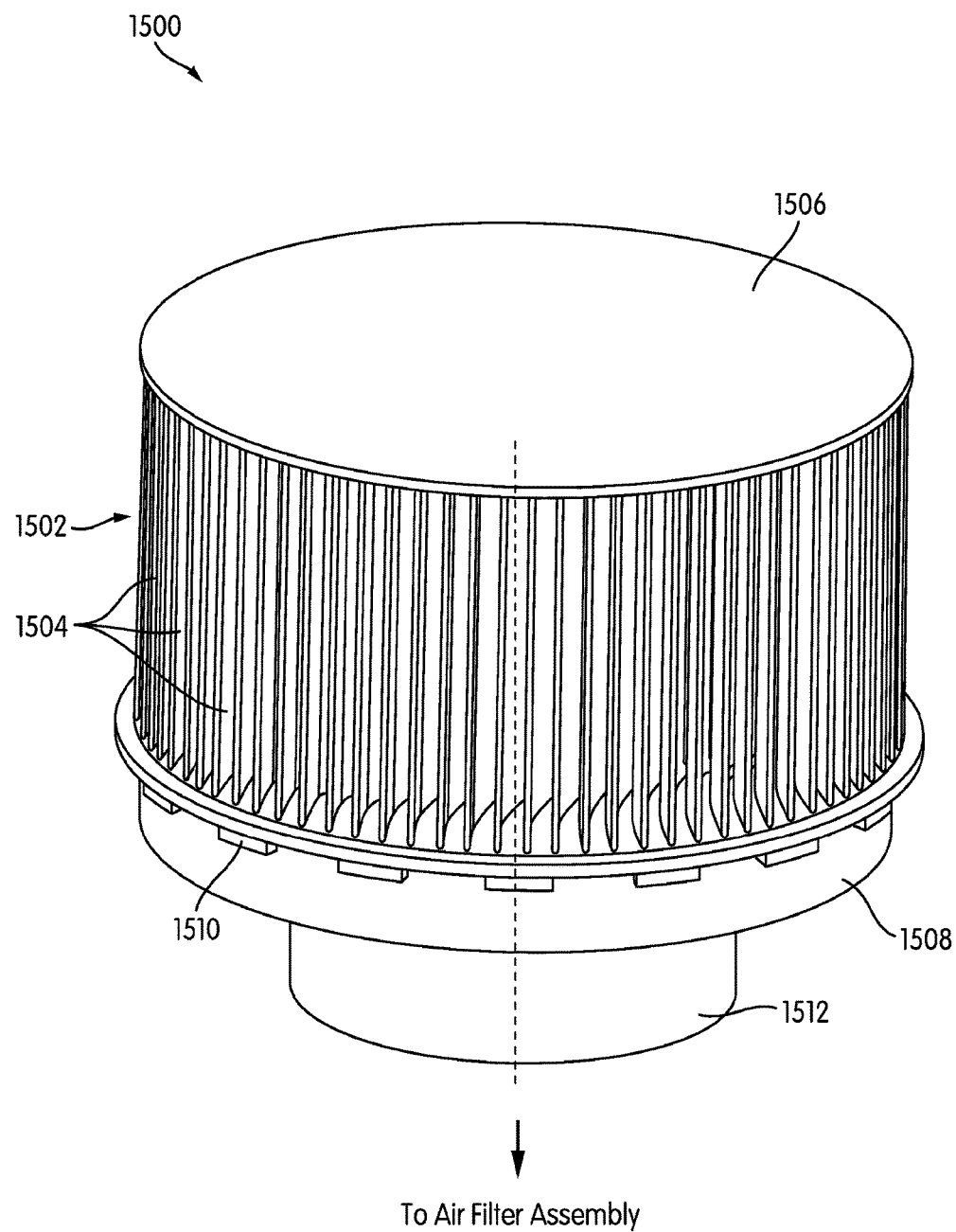
FIG. 15 is a perspective view of an air intake duct according to another exemplary embodiment.
Figure 17:
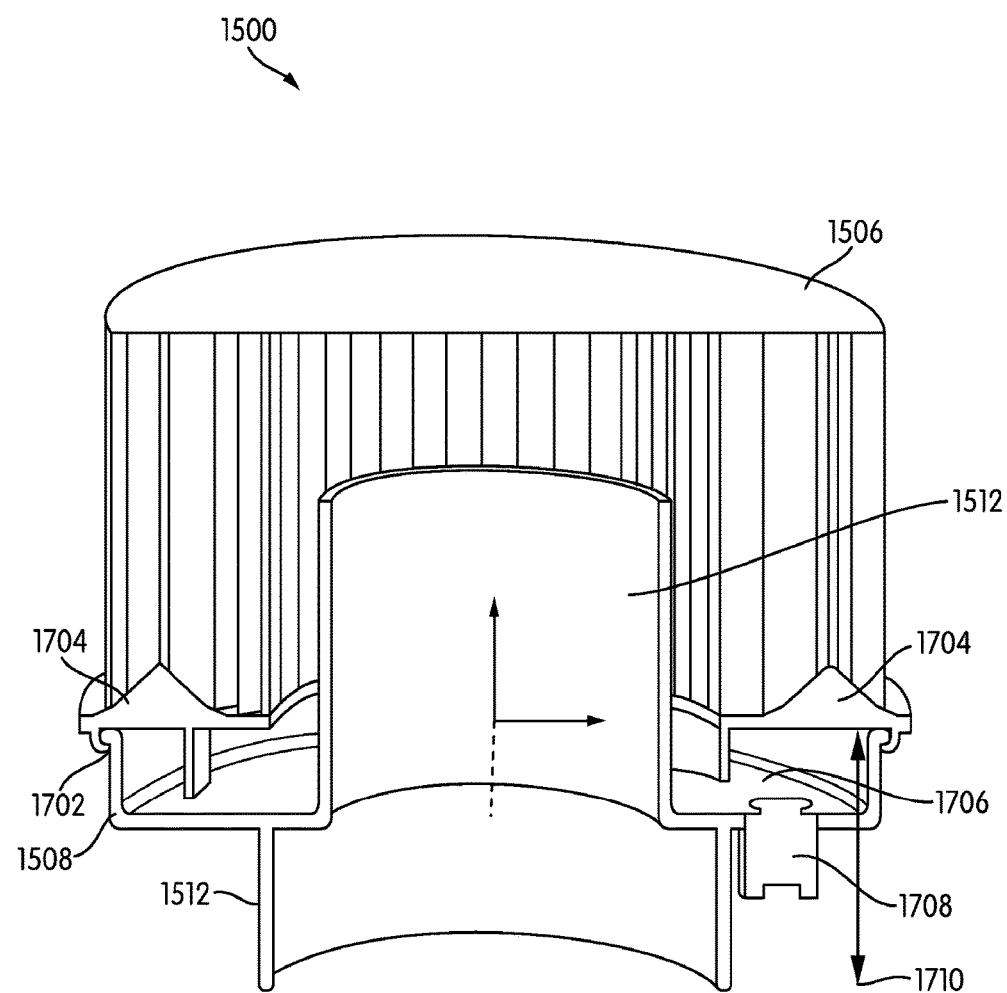
FIG. 17 is a side cross-sectional view of the air intake duct of FIG. 15.

FIG. 15 is a perspective view of an air intake duct 1500 is shown according to still another exemplary embodiment. The air intake duct 1500 is similar to air intake ducts 100 and 1200. The air intake duct 1500 receives intake air through a separator 1502. The separator is cylindrical in shape. The separator 1502 includes a plurality of louvers 1504. The plurality of louvers are arranged in a cylindrical manner to form the cylindrical shape of the separator. Each of the plurality of louvers 1504 includes a plurality of planar sections arranged in an angled manner (as described in further detail below with respect to FIG. 15) that separate water contained in the intake air passing through the louvers 1504. A cover 1506 is fit on top of the separator 1502. The cover 1506 is secured to the separator through any suitable connection, such as a snap fit connection, a fastener (e.g., mating threaded surfaces), an adhesive, etc. The separator 1502 is attached to a central tube 1508. The separator 1502 is attached to the central tube 1508 through a snap fit connection. The snap fit connection is formed when connectors 1510 are secured over a ridge (ridge 1702 as shown in FIG. 17) of the central tube 1508. The central tube 1508 is positioned downstream of the louvers 1504 in an air flow direction. The central tube 1508 includes an inner inlet 1512 that extends into the central tube 1508. The inner inlet 1512 is positioned downstream of the louvers 1504 in the air flow direction. The inner inlet 1512 is an inlet duct that provides the intake air to the air filter assembly (e.g., one of the air filter assemblies described above with respect to the air intake duct 100).

Figure 16:
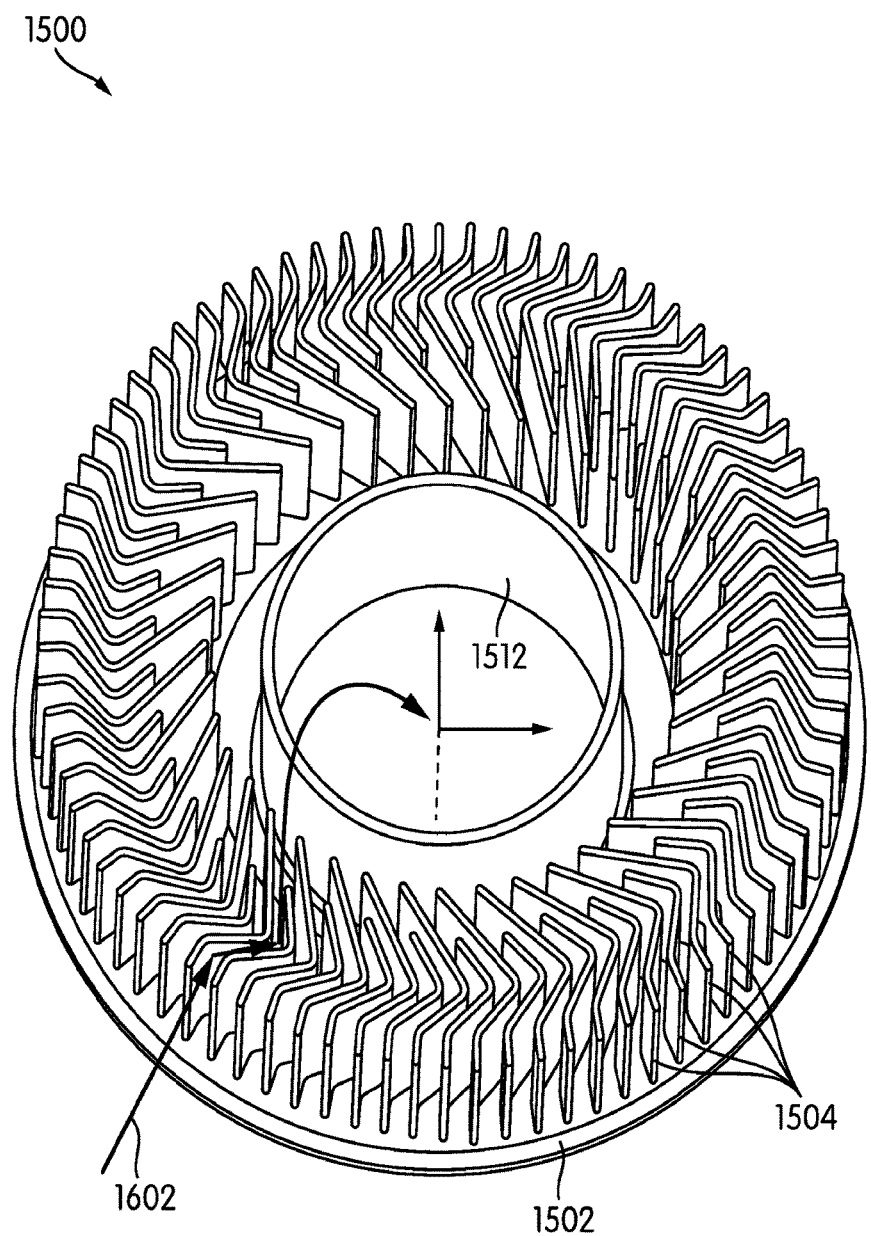
FIG. 16 is a top perspective view of the air intake duct of FIG. 15 with its cover removed.

Referring to FIG. 16, a top perspective view of the air intake duct 1500 without cover 1506 is shown. Each louver 1504 routes intake air along a flow path 1602 into the inner inlet 1512, where the intake air is then routed to the air filter assembly. Each louver 1504 includes a plurality of planar sections, each section arranged at an angle with respect to the adjacent sections. The sections are arranged in a similar manner as described above with respect to louvers 1204. Unlike louvers 1204, the sections of each louver 1504 form a single V portion. Alternate embodiments may form two or more V portions. The angles between the adjacent sections of the louvers 1504 cause abrupt changes in air flow direction in the flow path 1602. The abrupt changes in air flow direction create impaction sites that coalesce the water in the intake air. Because the water droplets in the intake air are heavier than the intake air, the water droplets coalesce and impact against the planar surfaces of the louvers 1504 at the impaction sites due to the greater inertia of the water droplets. As shown in FIGS. 12 and 14, the louvers 1204 are vertical such that the captured water droplets are carried down such that the captured water droplets do not enter the inner inlet 1512.

Referring to FIG. 17, a side cross-sectional view of the air intake duct 1500 is shown. As discussed above, the louvers 1504 are arranged in a vertical manner with respect to gravity. Accordingly, water that coalesces on the surface of the louvers 1504 falls to a ridge 1704. The ridge 1704 routes the coalesced water outside of the air intake duct 1500 or into a well 1706 formed by the central tube 1508 and the inner inlet 1512. The inner inlet 1512 extends into the central opening of the separator 1502 to prevent water gathered in the well 1706 from entering the inner inlet 1512. The inner inlet 1512 may act as a vortex finder if a swirl in of the intake air is generated by the louvers 1504. The gathered water is removed from the well 1706 through a drain 1708. The drain 1708 may be coupled to a duckbill valve that allows gathered water to flow out of the well 1706 and prevents backflow of air or other materials into the well 1706. The drain height 1710 is the distance between the bottom of the drain 1708 and the bottom of the separator 1502. The drain height 1706 may be between 1.5 to 5 times the number of inches of H$_2$O of pressure drop caused by the air intake duct 1500.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:
1. An air intake duct comprising:
   a plurality of louvers forming an air inlet to a housing, each louver including:
   an inlet section, and
   an angled section, the angled section inclined with respect to the inlet section;
   the housing positioned downstream of the plurality of louvers in an air flow direction, the housing including a drain configured to permit separated water from an intake air passing through the plurality of louvers and into the housing to be drained from the housing;

a ramp configured to guide separated water out of the plurality of louvers; and an inner inlet duct that provides the intake air to a component, the inner inlet duct extending into an internal volume defined by the housing and positioned downstream of the plurality of louvers in the air flow direction, the inlet duct extending above the drain by a distance thereby forming a well in the housing between a top of the inner inlet duct and the drain.

2. The air intake duct of claim 1, wherein each louver further includes a hook portion positioned downstream of the angled section of each louver, the hook portion configured to capture water droplets that coalesce on the inlet section and the angled section and route the captured water droplets away from the housing.

3. The air intake duct of claim 2, wherein each louver further includes an outlet section, and wherein, for each louver, the hook portion is positioned upstream of the outlet section.

4. The air intake duct of claim 1, wherein the angled section and the inlet section are substantially planar.

5. The air intake duct of claim 1, wherein the angled section is inclined by an angle with respect to the inlet section.

6. The air intake duct of claim 5, wherein the angle is less than 90 degrees.

7. The air intake duct of claim 6, wherein the angle is less than 45 degrees.

8. The air intake duct of claim 1, wherein the drain is oriented to cause an air flow eddy.

9. The air intake duct of claim 1, wherein the distance is between 1.5 and 5 times a number of inches of water of pressure drop caused by the air intake duct.

10. The air intake duct of claim 1, wherein the angled section is a first angled section, and wherein each louver further includes a second angled section, the first angled section and the second angled section forming a first V shape.

11. The air intake duct of claim 10, wherein each louver further comprises a third angled section and a fourth angled section, the third angled section and the fourth angled section forming a second V shape.

12. The air intake duct of claim 1, wherein the ramp is configured to direct separated water out of the air intake duct.

13. The air intake duct of claim 1, wherein the plurality of louvers are arranged in a cylindrical manner.

14. An air intake duct comprising:
a separator having a cylindrical shape, the separator including a plurality of louvers arranged in a cylindrical manner to form they cylindrical shape of the separator, each of the plurality of louvers including a plurality of planar sections arranged in an angled manner to separate water contained in intake air passing through the plurality of louvers;

a cover fit on a top of the separator;

a central tube, the separator attached to the central tube, the central tube positioned downstream of the plurality of louvers in an airflow direction; and an inner tube positioned downstream of the plurality of louvers in an air flow direction, the inner inlet tube extending into the central tube and further extending into a central opening defined by the separator.

15. The air intake duct of claim 14, further comprising a drain coupled to a duckbill valve that allows gathered water to flow out of a well and prevents backflow of air or other materials into the well.

16. The air intake duct of claim 14, wherein each of the plurality of louvers forms a single V portion.

17. The air intake duct of claim 14, wherein each of the plurality of louvers forms two or more V portions.

18. The air intake duct of claim 14, wherein the separator is attached to the central tube through a snap fit connection.

* * * * *